July 16, 1946.     B. E. YAGGY     2,404,018
AIRPLANE LANDING GEAR
Filed March 23, 1944
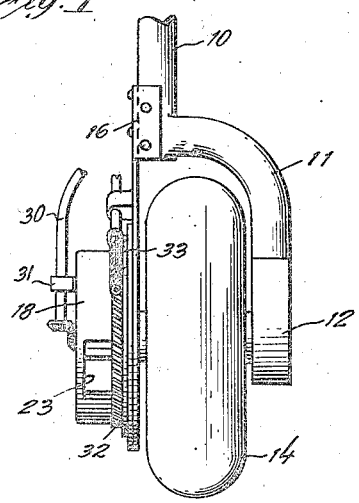
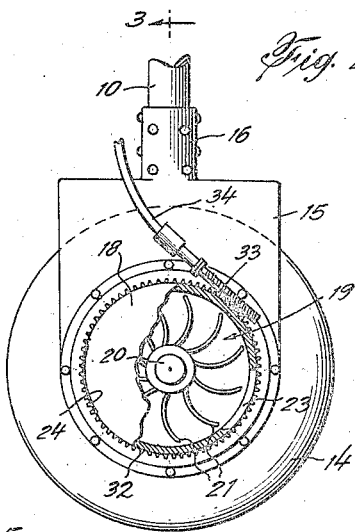
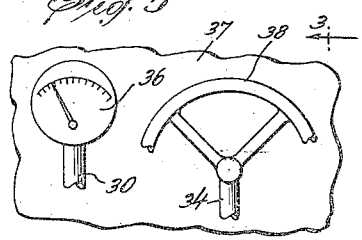
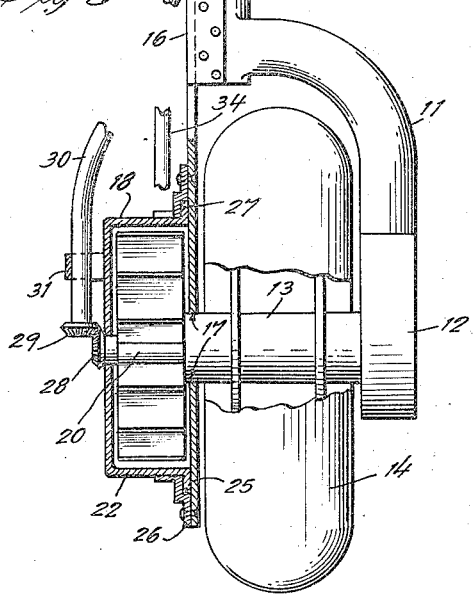
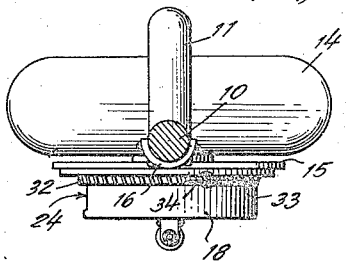
INVENTOR.
BERNARD E. YAGGY
BY F. Ledermann
ATTORNEY Patented July 16, 1946

2,404,018

UNITED STATES PATENT OFFICE 2,404,018

AIRPLANE LANDING GEAR

Bernard E. Yaggy, Waterloo, Iowa

Application March 23, 1944, Serial No. 527,811

4 Claims. (Cl. 244—103)

This invention relates to airplane wheels, and aims to overcome a difficulty met with in the landing of airplanes. It is well known to all experienced flyers, that when the plane touches the land it is traveling forward at a relatively high speed whereas the wheels of the landing gear are stationary, so that upon impact with the ground there is a positive even though momentary skidding of the wheels. This is more emphatically true of heavy planes, such as bombers, which carry large and heavy tires. Not only are the tires thereby subject to damage and wear, but smoother landings frequently result.

The above and other objects will become apparent in the description below, wherein characters of reference refer to like-numbered parts in the accompanying drawing. It is to be understood that the drawing is intended to serve the purpose of illustration only, and it is neither intended nor desired to limit the invention necessarily to the exact details shown, excepting insofar as they may be essential to the invention.

Referring briefly to the drawing,

Fig. 1 is a front elevational view of an airplane with the invention attached.

Fig. 2 is a side view of the same, with parts broken away.

Fig. 3 is an enlarged sectional view taken on the line 3—3 of Fig. 2.

Fig. 4 is a plan view of Fig. 3.

Fig. 5 shows a section of the control panel of the plane.

Referring in detail to the drawing, the numeral 10 indicates one of the arms or posts of the landing gear of an airplane, the lower end of the post being deformed to provide a bracket 11 having a bushing through its lower end 12 in which one end of a stub shaft, or wheel axle 13 is mounted. The tired wheel 14 is mounted on the axle 13 in the usual manner.

A plate or the like 15 has a fitting such as a semi-cylindrical extension 16 formed thereon or secured thereto, by means of which the plate is mounted on the outside of the wheel at right angles thereto, the extension 16 being attached to the post 10 by rivets or other suitable means. An opening 17 is provided through the plate 15.

A groove 25 is provided on the outside of the plate 15 by securing thereon a circular flange 26 which is substantially Z-shaped in cross-section. A cylindrical housing, having the peripheral wall 22 provided with an external flange 27 registering rotatably in the groove 25, is thus secured rotatably to the plate 15. A rotor 19 having the shaft 20 is mounted within the housing 18, and the shaft 20 and wheel axle 13 are coupled together by any desired means passing through the opening 17. The rotor 19 contains a plurality of spaced, arcuate radial vanes or fins 21 which are so curved, as shown in Fig. 2, that they offer their cupped faces toward the front below a horizontal plane through the wheel axle so that they may be actuated to rotate the rotor in the same direction as the wheel 14 rotates on landing. The wall 22 of the housing 18 is cut away at the front to provide an air inlet 23 and at the rear to provide an air outlet 24. The imaginary straight path from the inlet to the outlet follows that of a chord with respect to the external orbit of the rotor, the chord being located (Fig. 2) in the lower portion of the circle, rather than following a diametral direction.

A bevel gear 28 is provided on the end of the rotor shaft 20 and in mesh therewith is a bevel gear 29 secured on the end of a common type of flexible shaft 30, the latter being secured to the housing 18 by a strap 31. The wall 22 of the housing 18 is provided with external rack teeth 32 over a portion of its surface, and these teeth are engaged by a worm 33 on the end of a second flexible shaft 34.

Both flexible shafts 30 and 34 pass upward along the post 10 and are secured thereto at intervals by straps 35. The worm 33 is of course rotatably supported and positioned in an extension or auxiliary housing or support secured to the housing plate 15. The shaft 30 leads to a speed meter 36 mounted on the panel 37 inside the plane, which will obviously record the speed of rotation of the rotor and the wheel at all times. Also mounted on the panel 37 is a control wheel 38, to which is connected the shaft 34.

When a landing is about to be made and the landing gear has been fully extended, it is apparent from Fig. 2 that the wind entering the housing 18 through the inlet 23 will rotate the rotor, and hence the wheel, in the desired direction for the landing, the said wind passing out through the outlet 24. The speed or rotation of the wheel can be read on the meter 36, and, if desired, this meter could be calibrated to read the proper speed for every speed on the scale of landing speeds. If the speed of rotation of the wheel is too high, it can be slowed down by turning the control wheel 38 in the direction to cause the worm 33 to turn the housing 18 in a clockwise direction (Fig. 2), and the reverse would be done if it were found that the position of the opening 23 were such as to provide too slow a speed of the wheel. For it is obvious that the speed of rotation of the rotor will be controlled by the degree of directness with which the opening 23 faces into the wind, and by varying the angle of the opening 23 into the wind the speed of rotation of the wheel can thus be controlled from within the plane. Should the opening 23 lie in its lowermost possible position, it is apparent that the wheel would either stand still or turn at its minimum speed.

By means of this invention, the wheels of the landing gear may be set to rotate prior to landing of the plane, and, moreover, the speed of rotation of the wheels may be controlled to the exact speed desired upon striking the ground so that all tendency to skid is eliminated. Mere rotation of the wheels prior to landing will necessarily reduce the amount of skid, but exact synchronism of the wheels with the forward speed of the plane at the moment of touching the ground will completely eliminate skidding and consequent unnecessary wear of the tires, not to mention jarring of the plane.

Obviously, modifications in form and structure may be made without departing from the spirit and scope of the invention.

I claim:

1. In combination with the wheel support and the wheel of an airplane landing gear, a member secured to said support, said member having a circular flange on the outside thereof providing a circular groove thereon, a substantially cylindrical housing having a rotor therein and having an external flange registering rotatably in said groove, said rotor having vanes, said housing having a front opening adapted to direct the air stream to said vanes to rotate said wheel in a forward direction when the airplane is landing, said peripheral wall having spaced rack teeth thereon, a worm in mesh with said rack teeth, and means for rotating said worm.

2. The combination set forth in claim 1, said means comprising a flexible cable secured to said worm.

3. In an airplane, a landing wheel, an upright support for said wheel, a member secured to and extending from said support toward one side of the wheel, an annular impeller secured to said side of the wheel and having vanes, a substantially cylindrical casing enclosing said impeller and rotatably mounted on said member, said casing having a front opening adapted to direct the air stream to the vanes to rotate the wheel in a forward direction when the airplane is landing, said casing being disposed within the wheel area and having spaced rack teeth thereon, a worm in mesh with said rack teeth, and means for rotating said worm.

4. The combination set forth in claim 3, said means comprising a flexible cable secured to said worm.

BERNARD E. YAGGY.